United States Patent
Hahm et al.

(10) Patent No.: US 9,577,962 B2
(45) Date of Patent: Feb. 21, 2017

(54) DYNAMIC BUFFERING METHOD AND APPARATUS FOR PROVIDING STREAMING

(71) Applicant: Samsung Electronics Co., Ltd., Suwon-si, Gyeonggi-do (KR)

(72) Inventors: Seong-il Hahm, Yongin-si (KR); Pil-seob Kang, Suwon-si (KR); Han-min Bang, Gangneung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 14/185,224

(22) Filed: Feb. 20, 2014

(65) Prior Publication Data
US 2014/0244857 A1   Aug. 28, 2014

(30) Foreign Application Priority Data
Feb. 22, 2013 (KR) .................. 10-2013-0019378

(51) Int. Cl.
| | |
|---|---|
| G06F 15/16 | (2006.01) |
| H04L 12/861 | (2013.01) |
| H04L 12/26 | (2006.01) |
| H04L 29/06 | (2006.01) |
| H04N 21/433 | (2011.01) |
| H04N 21/442 | (2011.01) |

(52) U.S. Cl.
CPC ...... *H04L 49/9005* (2013.01); *H04L 43/0888* (2013.01); *H04L 65/80* (2013.01); *H04N 21/4331* (2013.01); *H04N 21/44209* (2013.01)

(58) Field of Classification Search
USPC .................. 709/223, 224, 231, 232, 233
See application file for complete search history.

(56) References Cited

U.S. PATENT DOCUMENTS

| | | | | |
|---|---|---|---|---|
| 6,138,163 | A * | 10/2000 | Nam | H04L 29/06027 |
| | | | | 348/E5.008 |
| 6,601,227 | B1 * | 7/2003 | Trimberger | G06F 17/5068 |
| | | | | 716/113 |
| 6,678,229 | B1 * | 1/2004 | James | G11B 20/10527 |
| | | | | 369/47.28 |
| 2001/0002910 | A1 * | 6/2001 | Kikuchi | H04L 12/5692 |
| | | | | 370/468 |
| 2001/0056351 | A1 * | 12/2001 | Valentine | G06F 17/30017 |
| | | | | 704/270 |
| 2004/0250039 | A1 * | 12/2004 | Hanks | G11B 20/10 |
| | | | | 711/168 |
| 2006/0109856 | A1 | 5/2006 | Deshpande | |
| 2008/0279207 | A1 * | 11/2008 | Jones | H04L 12/5693 |
| | | | | 370/412 |

(Continued)

FOREIGN PATENT DOCUMENTS

WO         2010085043 A2    7/2010

*Primary Examiner* — Liangche A Wang
(74) *Attorney, Agent, or Firm* — Jefferson IP Law, LLP

(57) ABSTRACT

A method of dynamically buffering content for providing a streaming service is provided. The method includes estimating a maximum amount of decrease in a network speed based on a result of measuring a network, and determining an amount of data to be buffered so that additional buffering, after playback of content is started, does not cause playback interruption, based on a maximum amount of decrease in the network speed, a total size of the content, a speed of playing the content, and a speed of receiving the content.

20 Claims, 7 Drawing Sheets

(56) References Cited

U.S. PATENT DOCUMENTS

| | | |
|---|---|---|
| 2010/0202509 A1 | 8/2010 | Thompson et al. |
| 2011/0161493 A1 | 6/2011 | Hamel et al. |
| 2011/0257983 A1* | 10/2011 | Rathonyi .............. G10L 19/167 704/503 |
| 2011/0307631 A1* | 12/2011 | Park ..................... G06Q 10/101 709/248 |
| 2012/0177101 A1 | 7/2012 | Van Der Schaar |
| 2012/0177105 A1 | 7/2012 | Hamel et al. |
| 2012/0311043 A1* | 12/2012 | Chen ................ H04N 21/23406 709/204 |
| 2013/0035083 A1 | 2/2013 | Kadel |

\* cited by examiner (TOTAL SIZE OF CONTENT=8Gbytes,
RECEPTION SPEED =1Mbit/s TO 20Mbit/s,
PLAYBACK SPEED=20.1Mbit/s, MAXIMUM AMOUNT OF
DECREASE IN NETWORK SPEED=0.2 )

DYNAMIC BUFFERING METHOD AND APPARATUS FOR PROVIDING STREAMING

CROSS-REFERENCE TO RELATED APPLICATION(S)

This application claims the benefit under 35 U.S.C. §119(a) of a Korean patent application filed on Feb. 22, 2013 in the Korean Intellectual Property Office and assigned Serial number 10-2013-0019378, the entire disclosure of which is hereby incorporated by reference.

TECHNICAL FIELD

The present disclosure relates to a buffering method for providing a streaming service, and an apparatus for performing the same.

BACKGROUND

A streaming service is a technology for transmitting and implementing data in real time. For example, a streaming service is a technology for transmitting and implementing data in real time so that a user may play content by downloading a part of the content without having to download the entire content. In other words, a streaming service is performed by transmitting only a part of the content, in correspondence with an amount of the content to be substantially played, in real time via a network. As technologies for providing such a streaming service have greatly advanced, a real-time Internet Protocol TeleVision (IPTV) service and a video-on-demand service are popular. Particularly, as a mobile device becomes more widely used, demand and use for a streaming service on a mobile device via a wireless network is increasing.

However, the streaming service is greatly affected by a network state. Because a frequency, a degree, and a pattern of using a network varies with users, a network state may vary greatly with time and location. Particularly, a streaming service for a mobile apparatus employs a wireless network method. Because fading or interference may occur to a wireless network due to environmental factors, it is highly possible that a communication signal may be changed. Thus, a wireless network state may be greatly changed, compared to a wired network state.

In order to provide a streaming service in a changing network state, buffering may need to be performed. Buffering is a method in which, when data is transmitted from a first apparatus to a second apparatus, if there is a difference in a data processing speed between the first apparatus and second apparatus, data is temporarily stored. Buffering is a technology used for all types of computer systems. In the case of a streaming service, buffering is performed by receiving and storing a certain amount of content in advance before the content is played, and then, playing the content. By buffering, if a network speed is momentarily decreased, stored content may be played. Conversely, if a network speed is increased, data that cannot be played immediately may be stored, and then, played as necessary. Thus, unnecessary retransmission of data may be prevented, and a user may be conveniently provided with a streaming service.

However, according to the related art, buffering sets to buffer a certain amount of content to be played or content for a certain period of time. Thus, a change in a network state is not taken into account. Accordingly, according to a change in a network state, additional buffering, which may be performed while content is played, may cause playback interruption. Thus, a user may be inconvenienced when using a service.

Additionally, according to the related art, buffering employs only a memory buffer. Because a capacity of the memory buffer is limited, a sufficient amount of the content to be played may not be buffered, and thus, playback of the content may be frequently interrupted.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a dynamic buffering providing method and apparatus for buffering in consideration of a network speed.

Additional aspects will be set forth in part in the description which follows and, in part, will be apparent from the description, or may be learned by practice of the presented various embodiments.

In accordance with an aspect of the present disclosure, a method of dynamically buffering content for providing a streaming service is provided. The method includes estimating a maximum amount of decrease in a network speed based on a result of measuring a network, and determining an amount of data to be buffered so that additional buffering, after playback of content is started, does not cause playback interruption, based on a maximum amount of decrease in the network speed, a total size of the content, a speed of playing the content, and a speed of receiving the content.

In accordance with an aspect of the present disclosure, the method may further include estimating a time for which reception of the content is finished based on the maximum amount of decrease in the network speed, wherein the determining of the amount of data to be buffered is performed by determining the amount of data to be buffered, based on a total size of the content, a speed of playing the content, and a speed of receiving the content during the time for which the reception of the content is finished.

In accordance with an aspect of the present disclosure, the time for which the reception of the content is finished may be estimated based on the maximum amount of decrease in the network speed and a probability of decrease in the network speed.

In accordance with an aspect of the present disclosure, the probability of decrease in the network speed may be determined to be proportional to the time for which the reception of the content is finished.

In accordance with an aspect of the present disclosure, the method may further include buffering the data, wherein the buffering may be performed by using both a memory buffer and a disk buffer.

In accordance with an aspect of the present disclosure, the time for which the reception of the content is finished may be estimated based on the result of measuring the network.

In accordance with an aspect of the present disclosure, the method may further include measuring a network state, wherein the measuring of the state of the network is performed by using a method of measuring a moving average of a network speed during a certain period of time.

In accordance with an aspect of the present disclosure, the maximum amount of decrease in the network speed may be estimated according to a frequency and a degree in which the network speed is changed.

In accordance with an aspect of the present disclosure, the measuring of the network state may include storing an amount of data that is received from the network and a time that is taken for the reception in a form of a table, and measuring a moving average of a network speed based on the amount of data and the time which are stored in the table.

In accordance with an aspect of the present disclosure, the time for which the reception of the content is finished may be when a probability of decrease in a network speed is 1.

In accordance with an aspect of the present disclosure, the amount of data to be buffered may be determined based on a ratio that is obtained by dividing a speed of receiving data of the content by a speed of playing the data of the content.

In accordance with an aspect of the present disclosure, the amount of data to be buffered may be determined by a value, which is obtained by dividing a total size of the content by a sum of first n terms in a geometric sequence with a first term of 1 and a common ratio of a value that is obtained by dividing the speed of receiving the content by the speed of playing the content, and wherein the n is changed based on the maximum amount of decrease in the network speed.

According to one or more various embodiments of the present disclosure, a non-transitory computer-readable storage medium having stored thereon a computer program, which when executed by a computer, may perform the method.

In accordance with another aspect of the present disclosure, an apparatus of dynamically buffering content for providing a streaming service is provided. The apparatus includes a network state measurement unit configured to determine a maximum amount of decrease in a network speed based on a result of measuring a network state based on a result of measuring a network, a buffering control unit configured to determine an amount of data to be buffered so that additional buffering, after playback of content is started, does not cause playback interruption, based on a maximum amount of decrease in the network speed, a total size of the content, a speed of playing the content, and a speed of receiving the content, and a data storage unit configured to receive and store the content.

In accordance with an aspect of the present disclosure, the buffering control unit may estimate a time for which reception of the content is finished based on the maximum amount of decrease in the network speed, and determines the amount of data to be buffered, based on a total size of the content, a speed of playing the content, and a speed of receiving the content during the time for which the reception of the content is finished.

In accordance with an aspect of the present disclosure, the time for which the reception of the content is finished may be estimated based on the maximum amount of decrease in the network speed and a probability of decrease in the network speed.

In accordance with an aspect of the present disclosure, the probability of decrease in the network speed may be determined to be proportional to the time for which the reception of the content is finished.

In accordance with an aspect of the present disclosure, the content storage unit may include a memory buffer and a disk buffer.

In accordance with an aspect of the present disclosure, the content storage unit may further include a buffer management unit configured to control the memory buffer and the disk buffer, wherein the buffering is performed by using both the memory buffer and the disk buffer.

In accordance with an aspect of the present disclosure, the time for which the reception of the content finished may be estimated based on the result of measuring the network.

In accordance with an aspect of the present disclosure, the network state measurement unit may measure a network state by using a method of measuring a moving average of a network speed during a certain period of time.

In accordance with an aspect of the present disclosure, the maximum amount of decrease in the network speed may be estimated according to a frequency and a degree in which the network speed is changed.

In accordance with an aspect of the present disclosure, the network state measurement unit may measure the network state by storing an amount of data that is received from the network and a time that is taken for the reception in a form of a table, and by measuring a moving average of a network speed based on the amount of data and the time which are stored in the table.

In accordance with an aspect of the present disclosure, the time for which the reception of the content is finished may be when a probability of decrease in a network speed is 1.

In accordance with an aspect of the present disclosure, the amount of data to be buffered may be determined based on a ratio that is obtained by dividing a speed of receiving data of the content by a speed of playing the data of the content.

In accordance with an aspect of the present disclosure, the amount of data to be buffered may be determined by a value, which is obtained by dividing a total size of the content by a sum of first n terms in a geometric sequence with a first term of 1 and a common ratio of a value that is obtained by dividing the speed of receiving the content by the speed of playing the content, and wherein the n is changed based on the maximum amount of decrease in the network speed.

In accordance with another aspect of the present disclosure, a method of dynamically buffering content for providing a streaming service is provided. The method includes determining an amount of data to be buffered based on at least one of an estimate of a likelihood that a network state will change, and an estimate as to an extent of a change in a network state, and buffering data associated with the content until the determined amount of data is buffered.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
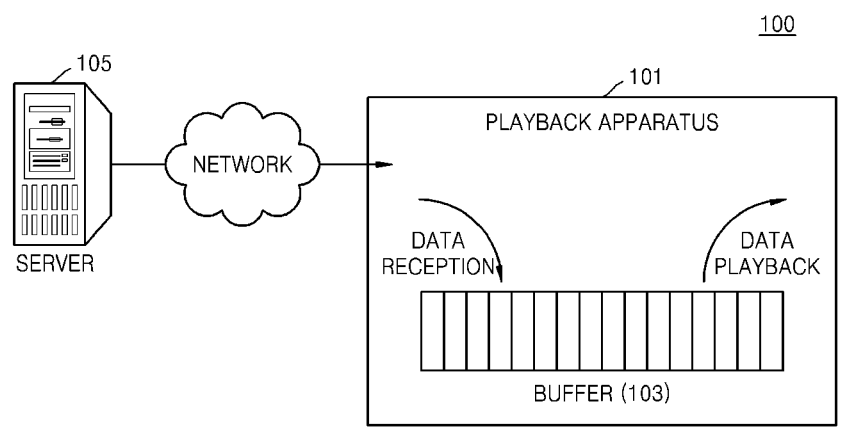
FIG. 1 is a diagram of a system for explaining a streaming service, according to an embodiment of the present disclosure.

FIG. 1 is a diagram of a system for explaining a streaming service, according to an embodiment of the present disclosure.

Referring to FIG. 1, in order for system 100 to provide a streaming service, a server 105 transmits content to a playback apparatus 101 via a network. Unlike a downloading method according to which all content is received, and then, in which the received content is played, a streaming service is performed by receiving content in correspondence with an amount of content which is necessary to play the content in real time. However, because a speed of receiving content from the server 105 is different from a speed of playing content by the playback apparatus 101, buffering is performed so as to efficiently and seamlessly provide a streaming service, The playback apparatus 101 receives content data for buffering and stores the received content data in a buffer 103. The playback apparatus 101 reads content data from the buffer 103 for playback of the content data, and plays the content data.

According to various embodiments of the present disclosure, the buffer 103 may include a memory buffer and a disk buffer, and may include all storage media that may function as a buffer.

In the description of various embodiments of the present disclosure, a content reception speed is a speed at which content or data is received from the server 105, and may include a network bandwidth, a network speed, a speed at which content is stored in a storage unit or the buffer 103, and/or the like. The content reception speed may be expressed in Bits/s, Mbits/s, Gbits/s, bps, Mbps, Gbps, or the like. The content reception speed represents a network speed that is measured by using the playback apparatus 101.

Additionally, in the description of various embodiments of the present disclosure, a content playback speed represents an amount that is necessary to play content and represents a speed at which content or data is played in the playback apparatus 101. The content playback speed may include a content bitrate or a speed of reading content from the storage unit or the buffer 103. The content playback speed may be expressed in bits/s, Mbits/s, Gbits/s, bps, Mbps, Gbps, or the like.

With regard to a streaming system shown as the system 100 in FIG. 1, in order to provide a smooth streaming service, the playback apparatus 101 may start playback of content, after buffering a certain amount of the content to be played before playback of the content is started. However, because a network state is constantly changed, playback may be stopped even when a streaming service is provided by performing buffering before starting playback. Accordingly, if the playback is stopped, the playback apparatus 101 provides a streaming service by buffering a certain amount of the content before playback is started again. In the description of various embodiments of the present disclosure, "before starting playback", described above, may include both "before starting playback first" and "before starting playback again after the playback is stopped".

However, while buffering is being executed, a user waits in a state in which playback is stopped. Thus, the number of times playback is stopped and buffering is generated needs to be minimized. In other words, if playback of all content data that is stored in the buffer 103 to be used for playback is finished, and thus playback is stopped, content needs to be received and stored in the buffer 103. As such, playback may be stopped due to buffering. For example, playback may be stopped until a sufficient amount of content for playback has been received and stored in the buffer 103.

A most secure method of minimizing buffering is to buffer all content to be played before starting playback. However, buffering all content to be played before starting playback is not different from a downloading method, and in this case, a user unnecessarily waits until all the content is buffered. Accordingly, an amount of data to be buffered needs to be determined so that the number of times, for which playback is stopped and buffering is generated, may be minimized and a time that a user waits may be minimized. Thus, according to various embodiments of the present disclosure, an amount of data to be buffered is determined so that a time for which a user waits may be minimized and, after content playback is started, additional buffering may not be performed.

When determining an amount of data to be buffered, it may be desirable to dynamically determine an amount of data to be buffered, in consideration of a change in a network state. In addition to a change in a network state, it may be desirable to consider a probability in which the network state is to be changed. According to various embodiments of the present disclosure, a method of determining an amount of data to be buffered based on a change in a network state and a probability in which a network state is to be changed is described in detail below.

Figure 2:
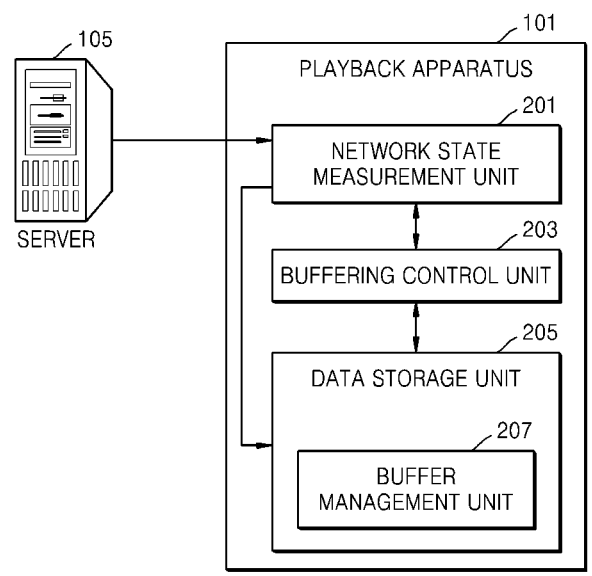
FIG. 2 is a diagram illustrating a structure of a dynamic buffering providing apparatus according to an embodiment of the present disclosure.

FIG. 2 is a diagram illustrating a structure of a dynamic buffering providing apparatus according to an embodiment of the present disclosure.

Referring to FIG. 2, the server 105 provides content to the playback apparatus 101 via a network by using a streaming service method.

In the description of various embodiments of the present disclosure, the playback apparatus 101 is a dynamic buffering providing apparatus. The playback apparatus 101 may include all apparatuses that may use a streaming service. For example, a playback apparatus may be a smart phone, a tablet, a mobile phone, a video phone, an e-book reader, a desktop computer, a laptop computer, a cellular phone, a Personal Digital Assistant (PDA), a notebook computer, a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, a playback apparatus may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, a playback apparatus may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, a playback apparatus may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, a playback apparatus may be any combination of the foregoing devices. In addition, it will be apparent to one having ordinary skill in the art that a playback apparatus according to various embodiments of the present disclosure is not limited to the foregoing devices.

A network state measurement unit 201 measures a network state. A network state includes a network speed and, additionally, may include a frequency or a degree of a network speed change. In the description of various embodiments of the present disclosure, a network measurement result may include a result of measuring a network speed, (e.g., a speed of receiving content or data), a frequency of a network speed change, or a degree of a network speed change.

According to various embodiments of the present disclosure, data to be buffered is determined by considering a network speed as a reference for a network state.

According to various embodiments of the present disclosure, the playback apparatus 101 may include a network state measurement unit 201, a buffering control unit 203, and a data storage unit 205.

According to various embodiments of the present disclosure, the network state measurement unit 201 may determine a maximum amount of decrease in a network speed, based on a network measurement result. A maximum amount of decrease in a network speed represents an estimated value of a maximum rate of an amount of decrease in a network speed. Additionally, a maximum amount of decrease in a network speed may include a minimum speed of an estimated network speed. In other words, a maximum amount of a decrease in a network speed refers to an estimated value of a network speed, and may represent a lowest speed or an amount of a decrease in a network speed, from among values of a network speed estimated during a time for which a change in a network state is measured. However, a maximum amount of a decrease in a network speed is not limited thereto, and may include all results that show a degree in which a network speed is to be decreased.

Additionally, the network state measurement unit 201 may receive information about a time unit to measure a change in a network state from a buffering control unit 203, and measure a change in a network state in a particular period of time. In other words, the network measurement unit 201 may measure a change in a network state in each particular period of time that is determined by the buffering control unit 203. Additionally, the network measurement unit 201 may store an amount of received data and a time that is taken to receive the data in the form of a table and, based on the amount of data and the time which are stored in the table, measure a change in a network state.

According to various embodiments of the present disclosure, a method of measuring a change in a network state may be performed by using a moving average method. The moving average method is one of the methods of calculating an average of continuously changing values. The moving average method is understood by one of ordinary skill in the art, and thus a detailed description thereof is not provided here.

According to various embodiment of the present disclosure, the buffering control unit 203 may determine a time for measuring a change in a network state. For example, according to various embodiments of the present disclosure, if a time unit for measuring a change in a network state, which is determined by the buffering control unit 203, is short, a real-time network state may be reflected well. The network state may be reflected well because a change in a network state may be measured continuously for a short period of time and applied to a method of obtaining data to be buffered. However, in this case, a network state may be greatly different from an average estimated value. Conversely, if a time unit for measuring a change in a network state is long, a value which is similar to an average network state may be obtained. However, detecting a drastic change in a network change in a particular period of time may be difficult. Accordingly, it may be desirable that the buffering control unit 203 determines a time unit for measuring a change in a network state, based on the change in the network state.

According to various embodiment of the present disclosure, the buffering control unit 203 receives information about a maximum amount of decrease in a network speed from the network state measurement unit 201. Then, based on a total size of content, a content playback speed, a content data reception speed, and/or the like, the buffering control unit 203 determines an amount of data to be buffered, so that additional buffering may not be performed after content playback is started.

Additionally, the buffering control unit 203 may determine a time for which the receiving of the content is finished, based on the maximum amount of decrease in the network speed. The buffering control unit 203 may determine an amount of the data to be buffered, based on a content playback speed and a content reception speed for a time during which reception of content is finished.

According to various embodiments of the present disclosure, the buffering control unit 203 may determine an amount of data to be buffered, based on a ratio that is obtained by dividing a content reception speed by a content playback speed.

Additionally, the buffering control unit 203 may determine an amount of data to be buffered as a value, which is obtained by dividing a total size of the content by a sum of first n terms in a geometric sequence with a first term of 1 and a common ratio of a value that is obtained by dividing the content reception speed by the content playback speed. According to various embodiments of the present disclosure, n may be changed based on the maximum amount of decrease in the network speed. According to various embodiments of the present disclosure, n may mean the number of processes in which content data is received and, while the received content data is played, a next part of the received data is received. In other words, n may represent the number of processes in which content data to be buffered is received, and then, if playback of the content data is started, a next part of the buffered content data is received while the buffered content data is played.

A method of the buffering control unit 203 determining an amount of data to be buffered will be described in detail by referring to FIGS. 3 through 10.

According to various embodiments of the present disclosure, information about a total size of content may be received from the server 105, or a data storage unit 205 in the playback apparatus 101, or a control unit (not illustrated).

According to various embodiments of the present disclosure, a content reception speed may be received from the data storage unit 205 or the control unit (not illustrated). The content reception speed may be received from the network state measurement unit 201 or the control unit (not illustrated).

According to various embodiments of the present disclosure, the data storage unit 205 receives content from the server 105 via the network, and stores the content. The data storage unit 205 may include a memory buffer, a disk buffer, and/or the like, but the data storage unit 205 is not limited thereto. The data storage unit 205 may include all storage media that may function as a buffer. Additionally, the data storage unit 205 may further include a buffer management unit 207 for controlling the memory buffer and the disk buffer.

According to various embodiments of the present disclosure, the playback apparatus 101 may perform buffering by using both the memory buffer and the disk buffer. If only the memory buffer is used, an amount of data that may be buffered is small. Thus, dynamically buffering the data according to a change in a network speed, and accurately measuring the network speed may be difficult. However, if buffering is performed by using both the memory buffer and the disk buffer, the playback apparatus 101 may adequately perform despite a change in a network state.

The disk buffer may be allocated to store all content. The buffer management unit 207 may copy data from the disk buffer to the memory buffer and, when the content is played, may read the content from the memory buffer and play the content.

Additionally, according to various embodiments of the present disclosure, the playback apparatus 101 may select content via a user interface (not illustrated).

Figure 3:
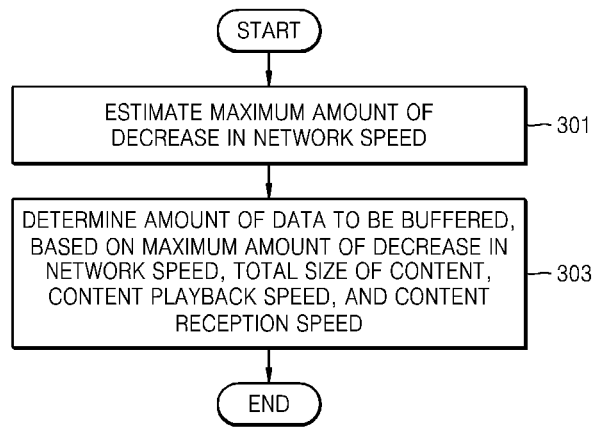
FIG. 3 is a flowchart of a dynamic buffering providing method according to an embodiment of the present disclosure.

FIG. 3 is a flowchart of a dynamic buffering providing method according to an embodiment of the present disclosure.

Referring to FIG. 3, at operation 301, the playback apparatus 101 estimates a maximum amount of decrease in a network speed. As described with reference to FIG. 2, the network state measurement unit 201, included in the playback apparatus 101, measures a change in a network state and, based on a result of measuring the change in the network state, estimates a maximum amount of decrease in a network speed.

A maximum amount of decrease in a network speed represents an estimated value of a maximum rate of decrease in a network speed. However, a maximum amount of decrease in a network speed is not limited thereto, and may include all results from which a degree of decrease in a network speed may be estimated. Additionally, a maximum amount of decrease in a network speed may include a minimum network speed.

Additionally, a maximum amount of decrease in a network speed may be determined according to a frequency and a degree in which a network state is changed.

At operation 303, the playback apparatus 101 determines an amount of data to be buffered, based on a maximum amount of decrease in a network speed, a total size of content, a content playback speed, and a content reception speed. According to various embodiments of the present disclosure, the buffering control unit 203, which is included in the playback apparatus 101, determines the amount to be buffered.

According to various embodiments of the present disclosure, the playback apparatus 101 may determine an amount of data to be buffered, based on a ratio that is obtained by dividing a content reception speed by a content playback speed. Alternately, the buffering playback apparatus 101 may determine an amount of data to be buffered as a value that is obtained by dividing a total size of the content by a sum of first n terms in a geometric sequence with a first term of 1 and a common ratio of a value that is obtained by dividing the content reception speed by the content playback speed.

According to various embodiments of the present disclosure, n may mean the number of processes in which content data is received and, while the received content data is played, a next part of the received data is received. According to various embodiments of the present disclosure, n may be changed based on the maximum amount of decrease in the network speed. In other words, n may represent the number of processes in which content data to be buffered is received, and then, if playback of the content data is started, a next part of the buffered content data is received while the already-buffered content data is played.

For example, when n is determined based on a maximum amount of decrease in a network speed, an amount of data to be buffered is determined by estimating data reception is to be finished until a process is repeated for n times. Thus, if a network speed is not reduced up to the maximum amount of decrease in the network speed, a streaming service may be provided without having to perform additional buffering after playing is started. Additionally, n may be determined in consideration of a probability of decrease in the network speed, as well as the maximum amount of decrease in a network speed.

Figure 4:
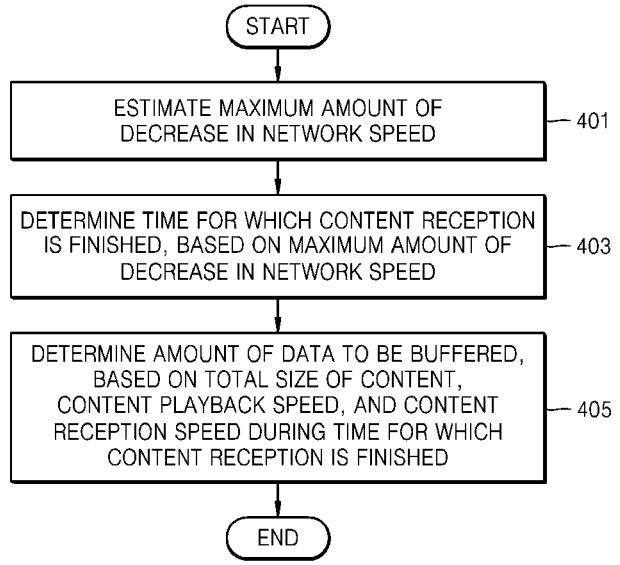
FIG. 4 is a flowchart of a dynamic buffering providing method according to an embodiment of the present disclosure.

FIG. 4 is a flowchart of a dynamic buffering providing method according to an embodiment of the present disclosure.

At operation 401 a maximum amount of decrease in a network speed is estimated. The maximum amount of decrease in a network speed may be estimated similar to the estimation of the maximum amount of decrease in the network speed estimated at operation 301.

At operation 403, a time for which the receiving of content is finished is determined based on a maximum amount of decrease in a network speed. According to various embodiments of the present disclosure, a time for which the receiving of a total size of content is finished is determined based on a value of a maximum amount of decrease in a network speed. A time at which the receiving of a total size of content is finished at a speed may be estimated by estimating a rate of maximum decrease in the network speed and determining a minimum network speed.

According to various embodiment of the present disclosure, a time for which receiving of content is finished may be estimated based on the maximum amount of network speed decrease and a probability of network speed decrease. Additionally, a probability of network speed decrease may be determined to be proportional to a time for which content reception is finished. Additionally, time for which content reception is finished may be estimated with reference to a probability of network speed decrease of 1.

At operation 405, an amount of data to be buffered may be determined based on a total size of the content, a playback speed of the content, and a reception speed of the content during a time for which reception of the content is finished. The time, for which the content reception is finished, is measured based on a maximum amount of decrease in a network speed. Then, an amount of data to be buffered may be estimated in consideration of a content playback speed and a content reception speed, so that there is no additional buffering after playback is started. A change in a network state may be present during buffering. However, because the maximum amount of decrease in the network speed has been taken into account, unless a network speed is reduced up to an estimated maximum amount of decrease in a network speed, a streaming service may be provided without having to perform additional buffering.

Figure 5:
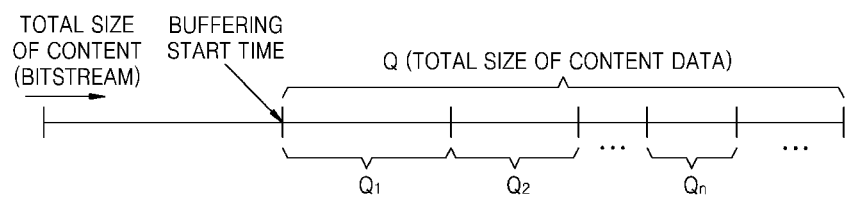
FIG. 5 is a diagram for explaining dynamic buffering according to an embodiment of the present disclosure.

FIG. 5 is a diagram for explaining a concept of buffering according to an embodiment of the present disclosure.

Referring to FIG. 5, a long horizontal line represents a bitstream of a total size of content data. In the description of various embodiments of the present disclosure, a total size of content data may be, before content is played first, a total amount of the content data. A total size of content data may also be, while the content is being played, a size of remaining content until playback of the content is finished.

According to various embodiments of the present disclosure, a buffering start time refers to a point of time when data that is stored in a buffer is all exhausted during playback, and thus buffering is needed, or a point of time when buffering is necessary before the content is played first. Content data size to be received from a buffering start time may be expressed as Q. According to various embodiments of the present disclosure, Q may also represent a total size of content.

According various embodiments of present disclosure, in order to provide a smooth streaming service, if buffering is necessary before content playback is started, an amount of data to be buffered needs to be determined, and then, received to start the playback of the content. In FIG. 5, $Q_1$ corresponds to an amount of data to be buffered. The playback apparatus 101 starts playback after performing buffering in correspondence with an amount of $Q_1$.

According to various embodiments of the present disclosure, $Q_2$ corresponds to an amount of content data, which is received from a network while buffered content data in correspondence with an amount of $Q_1$ is played. Likewise, $Q_3$ corresponds to an amount of content data, which is received from a network while content data in correspondence with an amount of $Q_2$ is played. Such a process may be repeated until playback of the content data is finished. In a general expression, $Q_i$ is content that is received while content data is played in correspondence with an amount of $Q_{i-1}$.

According to various embodiments of the present disclosure, an amount of data, which is received while the received content is played, may be determined by multiplying a ratio of a content reception speed to a content playback speed by an amount of already-received content. If a content reception speed is S and a content playback speed is B, Equation (1) may be expressed as follows:

$$Q_i = \left(\frac{S}{B}\right)^{i-1} \cdot Q_1 \qquad \text{Equation (1)}$$

As a reference, as described with regard to FIG. 1, a content reception speed represents a measured network speed or a network speed that is estimated by a measurement. A content playback speed represents an amount of data that is necessary to play content. A network speed may be expressed in units for representing a speed, such as bits/s, but is not limited thereto.

Hereinafter, data to be buffered in an ideal network, in which a network speed that is measured by the network state measurement unit 201 is accurate, is calculated. An ideal network may mean a network of which a speed is the same as a network speed that is measured by the network state measurement unit 201, a network in which error range of a change in the network speed is small, and/or the like.

According to various embodiments of the present disclosure, after buffering is performed first, in order to receive a streaming service without playback interruption, which may be caused by additional buffering, a time that is taken for receiving content data except for an amount of first-buffered data may need to be identical to a time that is taken from playback interruption to finishing the playback (e.g., remaining playback time). If a time that is taken for receiving content data, except for an amount of buffered data, is $T_b$ and a remaining playback time is $T_r$, Equation (2) may be expressed as follows:

$$T_r = T_b \qquad \text{Equation (2)}$$

The remaining playback time is time that is taken for playing received data, and thus is calculated by dividing a total size of the content by the content playback speed. Thus, an Equation (3) thereof may be expressed as follows:

$$T_r = \sum_{i=1}^{\infty} \frac{Q_i}{B} = \sum_{i=1}^{\infty} \left(\frac{S}{B}\right)^{i-1} \cdot \frac{Q_1}{B} = T_1 \sum_{i=1}^{\infty} \left(\frac{S}{B}\right)^{i-1} \qquad \text{Equation (3)}$$

A size of remaining content, except for an amount of data to be buffered, may be expressed as $Q-Q_1$. $T_b$, which is a time taken for receiving remaining content data, may be expressed by using Equation (4) shown below.

$$T_b = \left(\frac{Q - Q_1}{S}\right) \quad \text{Equation (4)}$$

By using Equation (2), Equations (3) and (4) may be summarized as shown in Equation (5) below, in order to determine $Q_1$ that is an amount of data to be buffered.

$$Q_1 = \frac{Q}{\sum_{i=0}^{\infty}\left(\frac{S}{B}\right)^i} = \left(1 - \frac{S}{B}\right) \cdot Q \quad \text{Equation (5)}$$

However, with regard to Equation (5), B, a content reception speed B may need to be less than S a content playback speed S. For example, the content reception speed may need to be less than the content playback speed because, when a content reception speed is greater than a content playback speed, buffering may be unnecessary.

Figure 6:
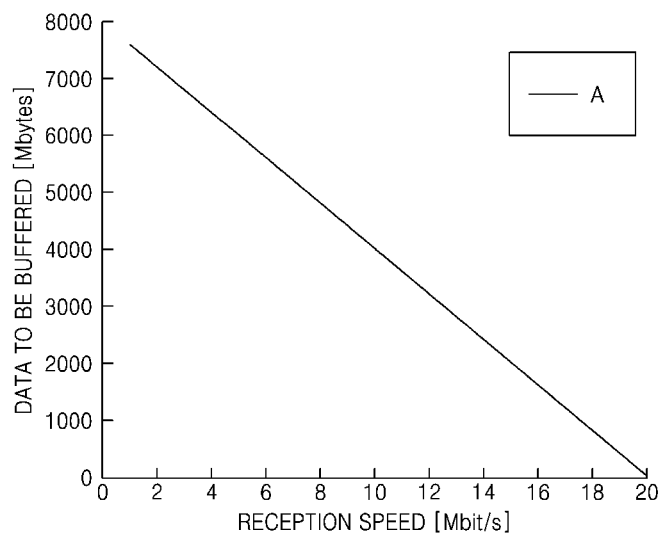
FIG. 6 is a graph showing a correlation of data amount to be buffered with a content reception speed in an ideal network, according to an embodiment of the present disclosure.

FIG. 6 is a graph showing a correlation of data amount to be buffered with a content reception speed in an ideal network according to an embodiment of the present disclosure.

Equation (5) that is determined with respect to FIG. 5 and $Q_1$ that is an amount of data to be buffered, as determined according to Equation (5), are obtained on an assumption that a network speed, which is measured by the network state measurement unit 201, is accurate. Thus, by using Equation (5) and $Q_1$, an amount of data to be buffered based on the measured network speed may be accurately estimated. In other words, as shown in a graph A shown in FIG. 6, a network speed is accurately inversely proportional to an amount of data to be buffered.

Referring to the graph A shown in FIG. 6, as a reception speed increases, and thus, the content reception speed is approximately the content playback speed, an amount of data to be buffered decreases.

However, in the ideal network described with regard to FIG. 5, a network speed is assumed to be accurately measured and estimated. In other words, it is expected that a network speed that has been monitored up to now may not be greatly changed until playback of content that is currently being streamed is finished. In reality, it is almost impossible that a network speed may not be greatly changed. Thus, if applied to a real network, the method described with regard to FIG. 5 may be greatly inefficient.

In other words, because an amount of decrease in a network speed and a probability of decrease in the network speed are not taken into account, an algorithm, described with regard to FIG. 3, may not efficiently operate in a network.

Figure 7:
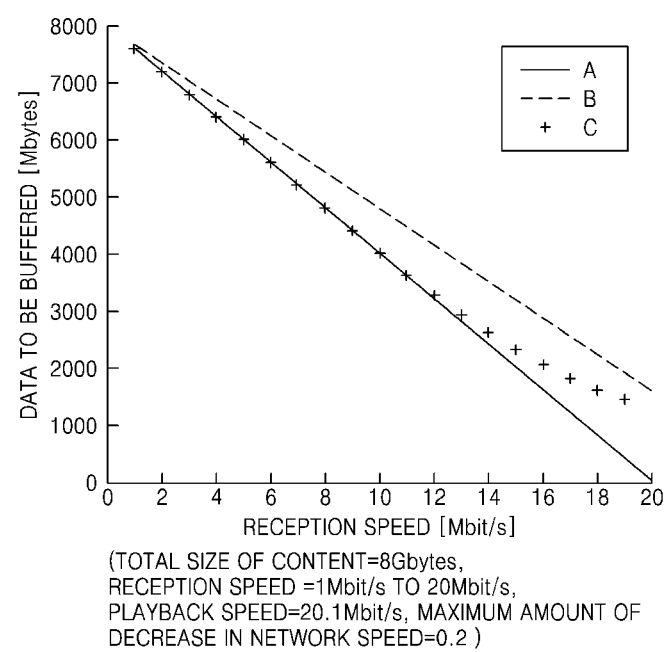
FIG. 7 is a graph showing a correlation of data amount to be buffered with a content reception speed in a network of which a state is changing, according to an embodiment of the present disclosure.

FIG. 7 is a graph showing a correlation of data amount to be buffered with a content reception speed in a network of which a state is changing, according to an embodiment of the present disclosure.

Hereinafter, determining of data to be buffered in consideration of a degree and a probability of decrease in a network speed, and a form of a graph that is obtained in consideration of a probability of decrease in a network speed are described.

If a content reception speed is changed before $Q_1$ (e.g., an amount of data to be buffered) is all received, the changed content reception speed may be reflected in determining $Q_1$. Additionally, if a content reception speed is increased after $Q_1$ is all received, buffering may not be generated again after the playback is started. However, if a content reception speed is decreased before $Q_1$ is all received, the playback may be stopped again, and buffering may be generated. Thus, $Q_1$ (e.g., an amount of data to be buffered) may differ. Because a measured reception speed may further decrease, in order to dynamically determine $Q_1$ according to a situation in which a network is changed, a maximum amount of decrease in a network speed needs to be reflected in Equation (5).

A maximum amount of decrease in a network speed represents an estimated value of a maximum rate of decrease in a network speed. If an estimated network speed is expected to decrease up to 20%, a maximum amount of decrease in a network speed is 20%. The maximum amount of decrease in the network speed may be expressed as 0.2. Additionally, according to various embodiments of the present disclosure, a maximum amount of decrease in a network speed may represent a minimum speed of the estimated network speed.

In addition to a maximum amount of decrease in a network speed, a probability, in which a maximum decrease in a network speed may be generated, may be taken into account, and reflected in Equation (5). This is expressed in Equation (6).

$$Q_E = \left\{1 - \frac{S}{B} \cdot (1 - E \cdot P_E)\right\} \cdot Q = \left(1 - \frac{S}{B} + E \cdot P_E \cdot \frac{S}{B}\right) \quad \text{Equation (6)}$$

$P_E$ represents a probability in which a maximum decrease in a network speed may be generated. However, accurately calculating $P_E$ may be difficult due to uncertainty of a network, particularly, signal interference, signal attenuation, or fading in a wireless network. However, it may be inferred that if a transmission time is long, a probability in which a network speed is changed may be increased. Additionally, if a transmission time is short, a probability in which a network speed is changed may be decreased.

As an example of research on a signal, when a mobile device is associated with one of Wi-Fi Access Points (APs) having a greatest signal strength in an area in which APs are crowded, a dwell time for which the mobile device is associated with one AP may approximately have a Pareto distribution. A Pareto distribution is understood by one of ordinary skill in the art. Thus, a detail description thereof is not provided here.

In detail, if a time interval for maintaining a signal strength of a network is increased, a dwell time on an AP is decreased. It may be inferred that, if a time interval is increased, a signal strength is not maintained, and thus it is highly possible that an AP that is connected to a mobile device may be changed. Accordingly, if $Q_E$ in Equation (6) is decreased, a reception time is increased after buffering is finished, and thus $P_E$ is increased. If $Q_E$ is increased, a reception time is decreased after buffering is finished, and thus $P_E$ is decreased. This may be expressed as Equation (7).

$$P_E = \left(1 - \frac{Q_E}{Q}\right) \cdot f(s/B, Q_E) \quad \text{Equation (7)}$$

$f(S/B, Q_E)$ represents a high-order term.

Because a maximum amount of decrease in a network speed and a probability of decrease in a network speed are taken into account, an amount to be buffered, in Equations (6) and (7), may be equal to or greater than $Q_1$ as determined in Equation (5). This may be expressed in Equation (8). Because a condition under which buffering is generated needs to be met, S, which is a content reception speed, is less than B, which is a content playback speed.

$$Q_E \geq \left(1 - \frac{S}{B}\right) \cdot Q \qquad \text{Equation (8)}$$

Summarizing Equations (6) and (7), $Q_E$, which is an amount of data to be buffered in consideration of a maximum amount of decrease in a network speed and a probability of decrease in a network speed, may be expressed as Equation (9).

$$Q_E = \left\{\frac{Q}{1 + E \cdot f(S/B, Q_E)}\right\} \cdot \left[1 - \frac{S}{B} \cdot \{1 - E \cdot f(S/B, Q_E)\}\right] \qquad \text{Equation (9)}$$

As shown in Equation (9), an amount of data to be buffered may be determined in consideration of a maximum amount of decrease in a network speed, a content reception speed, a content playback speed, a total size of content, and a probability of decrease in a network speed. Additionally, a maximum amount of decrease in a network speed may be determined according to a frequency and a degree of change in a network.

In Equation (8), because $P_E$ is most influenced by a value of $(1-Q_E/Q)$ that is a first term of $Q_E$, an approximate value may be obtained from $f(S/B, Q_E)$ by using Equation (10), except for a high-order term of $Q_E$.

$$f\left(\frac{S}{B}, Q_E\right) = \left(\frac{S}{B}\right)^a \qquad \text{Equation (10)}$$

In Equation (10), a is a constant greater than 0.

Referring to FIG. 7, the illustrated graph represents a correlation of data amount to be buffered with a content reception speed by substituting Equation (10) in Equation (11). However, because Equation (10) represents an approximate value of $f(S/B, Q_E)$, Equation (10) may be defined in a different form, within a scope that satisfies a condition of Equation (8).

A corresponds to a graph showing a correlation between $Q_1$, which is an amount of data to be buffered in an ideal network that is shown in FIG. 6, and a content reception speed. B corresponds to a graph showing a correlation of data amount to be buffered with a content reception speed, by substituting a constant for a in Equation (10). C corresponds to a graph showing a correlation of data amount to be buffered with a content reception speed, when $P_E$ is 1. According to a constant that is substituted for a, a graph that does not satisfy a condition of Equation (8) may be present. However, an error thereof is so small that such an error may be neglected.

FIG. 7 shows a correlation of data amount to be buffered with a content reception speed, which is determined by including an amount of decrease in a network speed and a probability of decrease in a network speed. In other words, if S/B is less than 0.5, the correlation of data amount to be buffered with a content reception speed is approximately that of the graph A that shows an ideal network. Conversely, if S/B is greater than 0.5, the correlation thereof is approximately that of the graph C that shows a probability of decrease in a network speed is 1.

If $Q_E$ that is an amount of data to be buffered is shown in the form of the graph B shown in FIG. 7, when the content reception speed is less than the content playback speed, the time for buffering may be increased. Because the content reception speed, which is changed during buffering, may be reflected in determining $Q_E$, the uncertainty of determining $Q_E$ may be decreased. Thus, it may be desirable to consider a maximum amount of decrease in the network speed to be small. If a content reception speed becomes similar to a content playback speed, a time for buffering may be decreased. Thus, it is desirable to consider a maximum amount of decrease in a network speed to be large.

Figure 8:
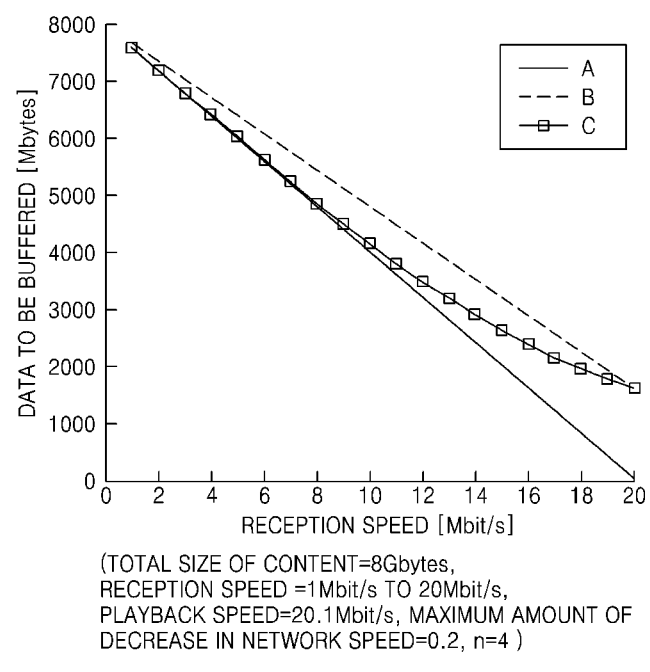
FIGS. 8, 9, and 10 are graphs showing a correlation of data amount to be buffered with a content reception speed according to a change in a network state, according to an embodiment of the present disclosure.
Figure 9:
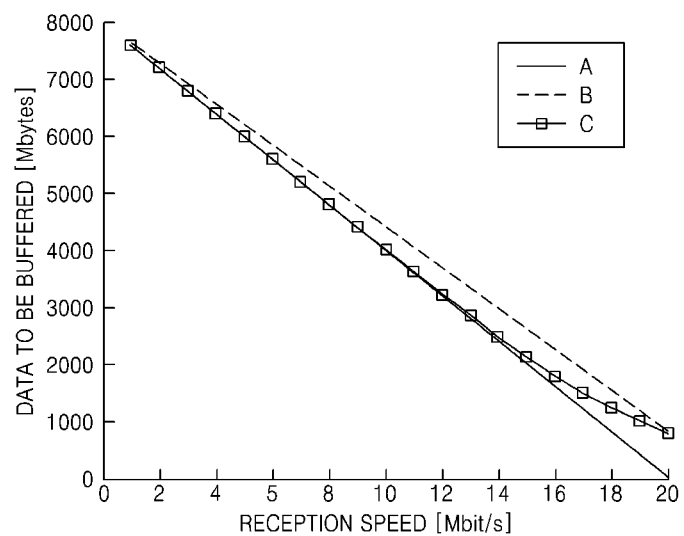
Figure 10:
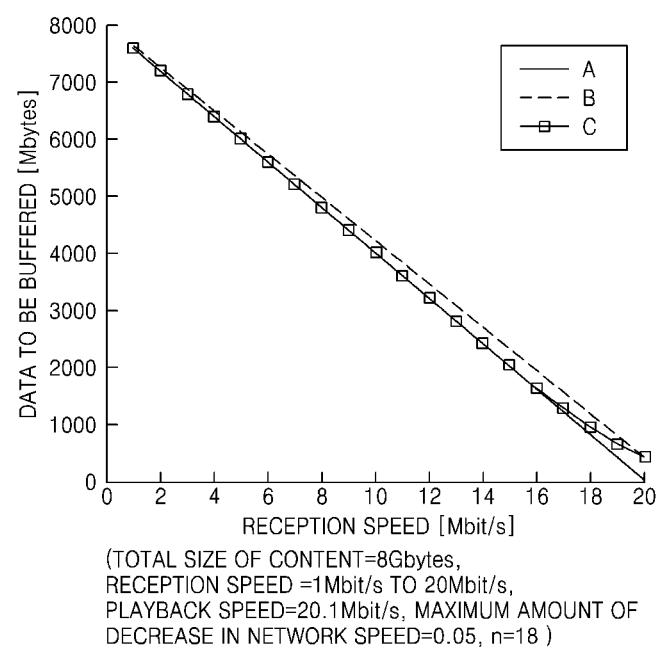

FIGS. 8, 9, and 10 are graphs showing a correlation of data amount to be buffered with a content reception speed in a network of which a state is changing, according to an embodiment of the present disclosure.

FIG. 8 shows a graph for explaining a method of determining an amount of data to be buffered in consideration of an amount of decrease in a network speed and a probability of decrease in a network speed, according to an embodiment of the present disclosure.

According to various embodiment of the present disclosure, as one of the methods of determining an amount of data to be buffered in consideration of an amount of decrease in a network speed and a probability of decrease, the dynamic buffering providing apparatus may determine an amount of data to be buffered by adjusting n, which is the number of processes of receiving content data and, during playback of the received content data, receiving a next part of already-received data, according to a maximum amount of decrease in a network speed and reflecting the decrease in a network speed.

If, after buffering, all content data is received until a particular time before playback is finished, after the playback of content is started, additional buffering may not result in stopping of the playback. Thus, a particular reference point, at which content reception is finished, may be determined. Accordingly, Equation (3) may be changed into Equation (11).

$$T_r = \sum_{i=1}^{n} \frac{Q_i}{B} = \sum_{i=1}^{n} \left(\frac{S}{B}\right)^{i-1} \cdot \frac{Q_1}{B} = T_1 \sum_{i=1}^{n} \left(\frac{S}{B}\right)^{i-1} \qquad \text{Equation (11)}$$

According to various embodiments of the present disclosure, n may represent the number of processes in which content data is received and, while the received content data is played, a next part of the received data is received. In other words, n represents the number of processes in which content data to be buffered is received, and then, if playback of the content data is started, a next part of the buffered content data is received while the already-buffered content data is played. According to various embodiments of the present disclosure, n is an integer equal to or greater than 1.

By using Equations (2) and (11), $Q_E$, which is an amount of data to be buffered, may be expressed as Equation (12).

$$Q_E = \frac{Q}{\sum_{i=0}^{n}\left(\frac{S}{B}\right)^i} \quad \text{Equation (12)}$$

$Q_E$, which is an amount of data to be buffered, is determined according to a total size of content Q, a content reception speed S, and a content playback speed B. In detail, $Q_E$, which is an amount of data to be buffered, is determined by dividing a total size of the content by a sum of first n terms in a geometric sequence with a first term of 1 and a common ratio of a value that is obtained by dividing the content reception speed by the content playback speed.

In contrast to Equation (3), because n is a limited integer in Equation (12), while $$\sum_{i=1}^{n} Q_i$$

is played, all content (e.g., all data of content) may be received. In other words, reception of all content of $$\sum_{i=1}^{n} Q_i$$

is finished, and then, content may not be received during an extra time that corresponds to $$\sum_{i=n+1}^{\infty} Q_i.$$

Thus, in consideration of a decrease amount and uncertainty of a network speed, an amount of data to be buffered is determined so that playback interruption is not caused by additional buffering that may be performed after buffering before the playback is started.

In other words, n represents a time, for which content reception is finished, as the number of processes in which content data to be buffered is received, and then, if playback of the content data is started, a next part of the buffered content data is received while the already-buffered content data is played. However, n represents a time, for which content reception is finished, as the number of processes. Thus, unlike Equation (12), a time, for which content reception is finished, may be estimated in consideration of a maximum amount of decrease in a network speed, instead of representing the time as n.

The graph C shown in FIG. 8, which represents a correlation of data amount to be buffered with a content reception speed, is identical to the graph C shown in FIG. 7. Because n is not an unlimited integer, a form of $Q_E$ is determined according to a ratio between a content reception speed and a content playback speed. Thus, because a decrease and a probability of decrease in a network speed are taken into account in Equation (11), if a remaining playback time is small, a probability in which a content reception speed is rapidly decreased may be decreased. Thus, the uncertainty of a network speed may be reflected little.

As described above, a maximum amount of decrease in a network speed may be determined according to a frequency and a degree in which the content reception speed is changed. Additionally, n may be determined according to a maximum amount of decrease in a network speed.

According to a maximum amount of decrease in a network speed, a method of determining n may be various. According to various embodiments of the present disclosure, the dynamic buffering providing apparatus may determine a maximum amount of decrease in a network speed, which is to be reflected when a content reception speed is approximately a content playback speed. This is expressed as Equation (3).

$$\underset{S \to B}{Q_E} = E \cdot Q \quad \text{Equation (13)}$$

In Equation (13), if the content reception speed is approximately the content playback speed, a probability, in which a network is changed, is determined as 1. Accordingly, if the content reception speed is approximately the content playback speed, a correlation of data amount to be buffered with a content reception speed in the ideal network meets the graph C in which a probability of decrease in a network space is 1. The content reception speed is not assumed to be identical to the content playback speed because if the content reception speed is identical to the content playback speed, buffering may be theoretically unnecessary.

With reference to Equations (12) and (13), an n may be determined. In other words, n is a value that may be changed based on a maximum amount of decrease in a network and, by using a value of n, $Q_E$ that is an optimum amount of data to be buffered may be determined. With reference to Equation (13), n according to a maximum amount of decrease in a network speed may be as shown in the table below.

TABLE

| Maximum amount of decrease in a network speed | n |
| --- | --- |
| 0.05 | 18 or 19 |
| 0.1 | 9 |
| 0.2 | 4 |
| 0.3 | 2 or 3 |
| 0.4 | 1 or 2 |

As described above, a maximum amount of decrease in a network speed represents an estimated value of a maximum rate of an amount of decrease in a network speed. For example, if a maximum amount of decrease in a network speed, shown in Table, is 0.05, it is determined that a network speed may be increased up to 5% based on an estimated content reception speed.

Accordingly, as described above, in order to determine n, a maximum amount of decrease in a network speed and a probability of decrease in a network speed are both taken into account. Thus, the graph C, shown in FIG. 8, may have an identical form to the graph C shown in FIG. 7, in which an amount of decrease in a network speed and a probability of decrease in a network speed are taken into account.

Referring to FIGS. 8, 9, and 10, as a minimum amount of decrease in a network speed is decreased, n is increased. When a minimum amount of decrease in a network speed is small, a network state may not be greatly changed. Thus, it may be determined that an amount of data to be buffered first, before playback is started, is small. In other words, even if an amount of data to be buffered first is determined to be small, because content is smoothly received during playback, n, which is the number of times playing data that is received during playback, may be increased.

Additionally, when a maximum amount of decrease in a network speed is determined based on a content reception speed that is measured with reference to Equation (13), various standards and methods may be employed according to various embodiments of the present disclosure.

According to various embodiments of the present disclosure, instead of using n in Equation (12), a time for which content reception is finished may be determined based on a maximum amount of decrease in a network speed and, based on this, an amount of data to be buffered may be determined. In other words, a time for which data reception is finished may be expressed as a time, instead of n. Thus, an amount of data to be buffered may be determined based on a maximum amount of decrease in a network speed, a total size of content, a content playback speed, and a content reception speed.

In other words, a maximum amount of decrease in a network speed may be an estimated value of a lowest speed during a certain period of time while content is received. Thus, a minimum value of an estimated content reception speed may be determined by using a measured network speed and a determined maximum amount of decrease in a network speed. Based on a minimum value of the estimated content reception speed, a time for which data reception is to be finished may be determined and, based on the determined time for which data reception is to be finished, a value of data to be buffered may be determined.

FIGS. 9 and 10 show graphs that represent different maximum amounts of decrease in a network speed from each other. Similar to FIG. 8, Equation (13) is employed as a reference for determining n, so as to represent a correlation of data amount to be buffered with a content reception speed. Graphs C shown in FIGS. 9 and 10 are represented in the form that is identical to the graph C shown in FIG. 8.

Referring to FIGS. 8, 9, and 10, as a minimum amount of decrease in a network speed is decreased, n is increased. When a minimum amount of decrease in a network speed is small, a network state may not be greatly changed. Thus, an amount of data to be buffered first, before playback is started, may be determined to be small. In other words, even an amount of data to be buffered first is determined to be small, because content is smoothly received during playback, n, which is the number of times playing data that is received during playback, may be increased.

In addition, other various embodiments of the present disclosure can also be implemented through computer-readable code/instructions in/on a medium (e.g., a non-transitory computer-readable medium), to control at least one processing element to implement various embodiments of the present disclosure. The medium can correspond to any medium/media permitting the storage and/or transmission of the computer-readable code.

The apparatus described herein may include a processor, a memory for storing program data and for executing the program data, a permanent storage such as a disk drive, a communications port for communication with external devices, and user interface devices, including a display, keys, and the like. The computer-readable code can be recorded/transferred on a non-transitory computer-readable storage medium in a variety of ways, with examples of the medium including recording media, such as magnetic storage media (e.g., ROM, floppy disks, hard disks, and the like) and optical recording media (e.g., CD-ROMs or DVDs), and transmission media such as Internet transmission media. Thus, the medium may be such a defined and measurable structure including or carrying a signal or information, such as a device carrying a bitstream according to one or more various embodiments of the present disclosure. The media may also be a distributed network, so that the computer-readable code is stored/transferred and executed in a distributed fashion. Furthermore, the processing element could include a processor or a computer processor, and processing elements may be distributed and/or included in a single device.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of various embodiments of the present disclosure, reference has been made to various embodiments illustrated in the drawings, and specific language has been used to describe these various embodiments. However, no limitation of the scope of various embodiments of the present disclosure is intended by this specific language, and various embodiments of the present disclosure should be construed to encompass all various embodiments that would normally occur to one of ordinary skill in the art.

Various embodiments of the present disclosure may be described in terms of functional block components and various processing steps. Such functional blocks may be realized by any number of hardware and/or software components configured to perform the specified functions. For example, various embodiments of the present disclosure may employ various integrated circuit components (e.g., memory elements, processing elements, logic elements, look-up tables, and the like), which may carry out a variety of functions under the control of one or more microprocessors or other control devices. Similarly, where the elements of various embodiments of the present disclosure are implemented using software programming or software elements, various embodiments of the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, various embodiments of the present disclosure could employ any number of conventional techniques for electronics configuration, signal processing and/or control, data processing and the like. The words "mechanism" and "element" are used broadly and are not limited to mechanical or physical various embodiments, but can include software routines in conjunction with processors, and/or the like.

The particular implementations shown and described herein are illustrative examples of various embodiments of the disclosure and are not intended to otherwise limit the scope of various embodiments of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of various embodiments of the present disclosure unless the element is specifically described as "essential" or "critical".

The use of the terms "a" and "an" and "the" and similar referents in the context of describing various embodiments of the present disclosure (especially in the context of the following claims) are to be construed to cover both the singular and the plural. Furthermore, recitation of ranges of values herein are merely intended to function as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or language (e.g., "such as") provided herein, is intended merely to better illuminate various embodiments of the present disclosure and does not pose a limitation on the scope of various embodiments of the present disclosure unless otherwise claimed. Additionally, it will be understood by those of ordinary skill in the art that various modifications, combinations, and changes can be formed according to design conditions and factors within the scope of the attached claims or the equivalents.

It should be understood that the various embodiments described therein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the following claims and their equivalents.

What is claimed is:

1. A method of dynamically buffering content for providing a streaming service, the method comprising:
   estimating an amount of decrease in a network speed based on a result of measuring a network; and
   determining an amount of data to be buffered before playback of content is started based on the amount of decrease in the network speed;
   storing the content received from an external device in a buffer based on the determined amount of data to be buffered; and
   playing the stored content,
   wherein the amount of decrease in the network speed is estimated according to the result of measuring the network during a predetermined period of time and a length of the predetermined period is determined based on a frequency or a degree of a network speed change.

2. The method of claim 1, wherein the determining of the amount of data to be buffered comprises:
   determining an amount of data to be buffered based on the amount of decrease in the network speed, a size of the content, a speed of playing the content, and a speed of receiving content.

3. The method of claim 1, further comprising:
   estimating a time for which reception of the content is finished based on the amount of decrease in the network speed;
   wherein the determining of the amount of data to be buffered is performed by determining the amount of data to be buffered, based on a total size of the content, a speed of playing the content, and a speed of receiving the content during the time for which the reception of the content is finished.

4. The method of claim 3, wherein the time for which the reception of the content is finished is estimated based on the amount of decrease in the network speed and a probability of decrease in the network speed.

5. The method of claim 4, wherein the probability of decrease in the network speed is determined to be proportional to the time for which the reception of the content is finished.

6. The method of claim 1,
   wherein the buffer comprises at least one of a memory buffer and a disk buffer.

7. The method of claim 3, wherein the time for which the reception of the content is finished is estimated based on the result of measuring the network.

8. The method of claim 1, further comprising:
   measuring a network state,
   wherein the measuring of the state of the network is performed by using a method of measuring a moving average of a network speed during a certain period of time.

9. The method of claim 1, wherein the amount of decrease in the network speed is estimated according to a frequency and a degree in which the network speed is changed.

10. The method of claim 4, wherein the time for which the reception of the content is finished is estimated with reference to a probability of network speed decrease of 1.

11. The method of claim 2, wherein the amount of data to be buffered is determined based on a ratio that is obtained by dividing a speed of receiving data of the content by a speed of playing the data of the content.

12. The method of claim 1,
   wherein the amount of data to be buffered is determined by using the following equation:

$$Q_E = \frac{Q}{\sum_{i=0}^{n}\left(\frac{S}{B}\right)^i},$$

and
   wherein $Q_E$ denotes the amount of data to be buffered, Q denotes a total size of the content, S denotes a content reception speed, and B denotes a content playback speed and wherein n denotes a variable value changed based on the amount of decrease in the network speed.

13. An apparatus of dynamically buffering content for providing a streaming service, the apparatus comprising:
   a network state measurement unit configured to estimate an amount of decrease in a network speed based on a result of measuring a network;
   a buffering control unit configured to determine an amount of data to be buffered before playback of content is started based on the amount of decrease in the network speed;
   a data storage unit configured to receive the content from an external device and store the content in a buffer based on the determined amount of data to be buffered; and
   a playing unit configured to playing the stored content,
   wherein the amount of decrease in the network speed is estimated according to the result of measuring the network during a predetermined period of time and a length of the predetermined period is determined by the buffering control unit based on a frequency or a degree of a network speed change.

14. The apparatus of claim 13, wherein the buffering control unit determines the amount of data to be buffered based on the amount of decrease in the network speed, a size of the content, a speed of playing the content, and a speed of receiving content.

15. The apparatus of claim 13, wherein the buffering control unit estimates a time for which reception of the content is finished based on the amount of decrease in the network speed, and determines the amount of data to be buffered, based on a total size of the content, a speed of playing the content, and a speed of receiving the content during the time for which the reception of the content is finished.

16. The apparatus of claim 15, wherein the time for which the reception of the content is finished is estimated based on the amount of decrease in the network speed and a probability of decrease in the network speed.

17. The apparatus of claim 15, wherein the probability of decrease in the network speed is determined to be proportional to the time for which the reception of the content is finished.

18. The apparatus of claim 14, wherein the amount of data to be buffered is determined based on a ratio that is obtained by dividing a speed of receiving data of the content by a speed of playing the data of the content.

19. The apparatus of claim 13, wherein the amount of data to be buffered is determined by using the following equation:

$$Q_E = \frac{Q}{\sum_{i=0}^{n} \left(\frac{S}{B}\right)^i},$$

wherein $Q_E$ denotes the amount of data to be buffered, Q denotes a total size of the content, S denotes a content reception speed, and B denotes a content playback speed, and wherein n denotes a variable value which is changed based on the amount of decrease in the network speed.

20. A non-transitory computer-readable storage medium having stored thereon a computer program, which when executed by a computer, performs the method of claim 1.

* * * * *